United States Patent [19]

Chan et al.

[11] Patent Number: 5,412,689
[45] Date of Patent: May 2, 1995

[54] MODAL PROPAGATION OF INFORMATION THROUGH A DEFINED TRANSMISSION MEDIUM

[75] Inventors: Byron K. Chan; Terrence R. Scott, both of Poughkeepsie, N.Y.

[73] Assignee: International Business Machine Corporation, Armonk, N.Y.

[21] Appl. No.: 996,409

[22] Filed: Dec. 23, 1992

[51] Int. Cl.⁶ .................... H04L 27/28; H04J 11/00
[52] U.S. Cl. ........................ 375/288; 370/18; 341/180
[58] Field of Search .......... 375/17, 24; 370/18; 341/56, 57, 100, 102, 180; 332/159

[56] References Cited

U.S. PATENT DOCUMENTS

| | | | |
|---|---|---|---|
| 3,511,936 | 5/1970 | Saltzberg | 375/37 |
| 3,518,547 | 6/1970 | Filipowsky | 370/21 |
| 3,810,019 | 5/1974 | Miller | 375/38 |
| 3,833,767 | 9/1974 | Wolf | 370/21 |
| 3,868,632 | 2/1975 | Hong | 340/146.1 |
| 4,293,953 | 10/1981 | Gutleber | 370/18 |
| 4,660,213 | 4/1987 | Holsinger et al. | 375/39 |
| 4,779,266 | 10/1988 | Chung et al. | 370/18 |
| 4,980,897 | 12/1990 | Decker et al. | 375/38 |
| 5,239,560 | 9/1993 | Daniel | 370/21 |

OTHER PUBLICATIONS

Nguyen et al., "Propagation Over Multiple Parallel Transmission Lines Via Modes," IBM Technical Disclosure Bulletin, vol. 32, No. 11, pp. 1-6, 1990.

Barcelo, Jr., et al., "Quaternary Logic Chanel for Binary Logic Interconnection," IBM Technical Disclosure Bulletin, vol. 32, No. 9A, pp. 365-0370, 1990.

Kadar, I., "Crosstalk Reduction Method for Multiconductor Transmission Line Structures," IBM Technical Disclosure Bulletin, vol. 26, No. 6, pp. 3058-3061, 1983.

*Primary Examiner*—Stephen Chin
*Assistant Examiner*—Timothy J. May
*Attorney, Agent, or Firm*—Lawrence D. Cutter; Kevin P. Radigan

[57] ABSTRACT

A method and system are provided for transmission of m information signal combinations over a known transmission medium at a high rate of speed without crosstalk between data transferred through the transmission medium. The technique employed is to convert each of the m information signal combinations to a unique line signal corresponding to one of n intrinsic orthogonal modes of the defined transmission medium through which the information is to be transmitted (wherein $m > n$). The encoded line signals, propagated via the orthogonal modes, are received and decoded at a remote location along the transmission medium to restore the original information data. The problem of assigning m unique line signals to each of the m possible information signal combinations is addressed by amplitude modulation of the transmission medium's n intrinsic orthogonal modes.

32 Claims, 6 Drawing Sheets

MODAL PROPAGATION OF INFORMATION THROUGH A DEFINED TRANSMISSION MEDIUM

TECHNICAL FIELD

The present invention relates in general to data communications and, more particularly, to the transmission of analog or digital data through a transmission medium having known characteristics at a high rate of speed without crosstalk between information signals transferred in parallel through the transmission medium.

BACKGROUND ART

A well documented and inherent difficulty in the parallel transmission of analog/digital information over a transmission medium, such as a plurality of parallel transmission lines, is signal crosstalk resulting from capacitive and inductive coupling within the transmission medium. The error rate due to crosstalk signal degradation typically increases with increasing speed of data transmission. This is because higher transmission speeds involve a greater number of possible values which make it increasingly difficult to distinguish between signals in the presence of an electrical impairment. The open literature contains a vast number of references which in general attempt to address the problem of signal noise on transmission lines, and in particular, to minimize crosstalk between information transmitted in parallel through a transmission medium having defined characteristics.

One interesting approach is discussed by T. H. Nguyen and T. R. Scott in an IBM Technical Disclosure Bulletin entitled "Propagation Over Multiple Parallel Transmission Lines Via Modes,+ Vol. 32, No. 11, April, 1990. As discussed therein, it is known that electromagnetic waves propagating over two conductors and a ground line have two orthogonal modes referred to as the "even mode" and the "odd mode." In general, n conductors and a ground line have n such orthogonal modes. Because of its orthogonal properties, each mode propagates independent of all other modes. The resolution of line voltages into orthogonal modes is analogous to the concept of resolving a pulse waveform into its orthogonal Fourier components. Just as the Fourier components can be studied separately because they are orthogonal, and hence independent of each other, so the intrinsic orthogonal modes of a plurality of transmission lines can be studied separately since they are also independent of each other.

The above-referenced IBM Technical Disclosure Bulletin describes the simplicity of orthogonal mode determination for those transmission lines having 2, 4, 8, ..., $2^n$ conductors symmetrically arranged on a cylindrical surface with respect to a coaxial ground conductor. The calculation of orthogonal modes for certain such transmission line configurations is presented. Although the mathematical groundwork for transmission of intrinsic orthogonal modes over a plurality of parallel transmission lines is discussed in this Technical Disclosure Bulletin, a practical implementation of the concept is lacking. The difficultly encountered is that the propagation of binary signals (for example) via modes is often not possible with only digital (i.e., on/off) signals since the number of modes is equal to the number of conductors (which can be doubled by using plus/minus designations), but the number of binary combinations is exponential, i.e., two raised to the number of conductors n.

Therefore, a need exists in the art for a practical approach (such as described herein) to allow the encoding of, for example, each possible binary signal combination as a unique orthogonal mode signal for transmission through a transmission medium having defined characteristics.

DISCLOSURE OF INVENTION

Briefly summarized, the present invention comprises in one aspect a method for transferring m information signal combinations through a defined transmission medium having n orthogonal modes, wherein $m > n$. The method includes the steps of: encoding the m information signal combinations for propagation through the transmission medium as line signals, each of which corresponds to one of the transmission medium's orthogonal modes (this encoding step includes deriving line signals for at least some of the m information signal combinations by amplitude modulating at least some of the transmission medium's n orthogonal modes); propagating the line signals through the transmission medium; and receiving the line signals propagated through the transmission medium and decoding the received line signals to restore the encoded m information signal combinations. Propagation of an information signal as a line signal pursuant to the method steps outlined restricts crosstalk within the transmission medium during the propagating step. This is because signals are transferred only in the orthogonal modes of the transmission medium.

Also disclosed is a method for encoding one of m information signal combinations for transfer over a transmission medium having known characteristics and n orthogonal modes, wherein $m > n$. The information encoding method includes the steps of: assigning a unique modal signal to each of the m information signal combinations such that each unique modal signal is identified with one of the transmission medium's n orthogonal modes; converting the one of m information signal combinations into its assigned unique modal signal; and driving the transmission medium in the orthogonal mode corresponding to the assigned unique modal signal. Thus, when propagating the information signal through the transmission medium as a signal corresponding to one of the transmission medium's orthogonal modes, crosstalk within the transmission medium is restricted. A decoding method, comprising the inverse to the outlined encoding technique, is also described and claimed.

In another aspect of the present invention, a system is disclosed for transferring one of m information signal combinations through a transmission medium having known characteristics and n orthogonal modes, wherein $m > n$. The system includes an encoder for encoding the selected one of m information signal combinations as a unique line signal corresponding to one of the transmission medium's orthogonal modes for propagation through the transmission medium in the corresponding orthogonal mode. The encoder includes a transformation mechanism for converting the selected information signal into a unique preassigned line signal. (At least some of the unique line signals are defined by amplitude modulating at least some of the transmission medium's n orthogonal modes.) Drivers then propagate the unique line signal through the transmission medium in the corresponding orthogonal mode. A receiver receives the propagated line signal and decodes the line signal to restore the one of m information signal combinations. Thus, propagation of the information signal as a line signal corresponding to one of the transmission medium's n orthogonal modes restricts crosstalk within the transmission medium during signal propagation through the transmission medium. Unique to the invention is the concept for defining a line signal for each of m information signals to be propagated over the transmission medium wherein the medium has n orthogonal modes and wherein $m > n$.

To summarize, presented herein is a novel and practical approach to implementation of orthogonal mode signal transmission of m information signals over a predefined transmission medium having n orthogonal modes, wherein $m > n$. Specific encoding and decoding circuits and techniques are presented. The important benefit to the practical approach described is that orthogonal modes propagate independently of each other with no crosstalk. Therefore, accurate propagation of information over longer transmission lines is feasible and practical, along with an increase in data transmission rates without increased error. Further, parity checking is less important for propagation of signals via modes since they do not interact. In fact, parity information is intrinsic to the transmitted signals.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Disclosed herein are encoding/decoding methods and systems for converting each of m possible information signal combinations into a unique line signal identified with one of n orthogonal modes (including ± polarities) of a transmission medium having known characteristics through which the information signals are to be transmitted, wherein $m > n$. The encoded line signals (or line voltages), propagated via the orthogonal modes, are received and decoded at a remote location along the transmission medium to restore the original data, i.e., information signals. Again, the benefit to such a transmission approach is that crosstalk between signals transmitted in parallel is eliminated. The inherent problem associated with modal transmission of information, along with the inventive solution presented herein, can be better explained with reference to a specific example.

Figure 1:
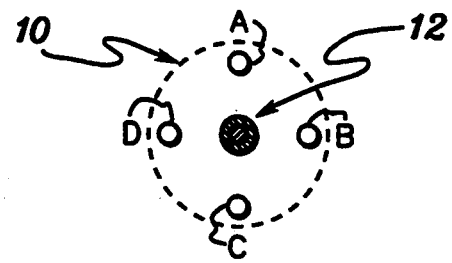
FIG. 1 is a cross-sectional view of one embodiment of a four conductor transmission line wherein the conductors are substantially symmetrically arranged about a coaxial ground line.

FIG. 1 depicts a transmission medium 10 having four parallel transmission lines, labeled A, B, C & D, arranged substantially symmetrically about a coaxial ground line 12. Selection of transmission medium 10 to have a symmetrical configuration such as that depicted simplifies decomposition of voltages into orthogonal modes. However, symmetry is not essential to the present invention. Those skilled in the art will be able to determine orthogonal modes for almost any transmission medium (including a single strand optical fiber) through which information is to be transferred and crosstalk between lines minimized, but the invention assumes that the characteristics of the medium are known.

With four parallel transmission lines, sixteen possible parallel signal combinations of binary information ($2^4 = 16$) can be transmitted. Eight of the sixteen combinations can be readily converted to mode signals having symmetrical plus and minus polarities, as shown by the following matrix transformation.

$$[U] = \begin{bmatrix} \text{Eigenvectors} \\ \text{matrix} \end{bmatrix} \begin{bmatrix} \text{Bit} \\ \text{Patterns} \end{bmatrix}$$

$$\begin{bmatrix} U1 \\ U2 \\ U3 \\ U4 \end{bmatrix} = \begin{bmatrix} +1+1+1+1 \\ +1+1-1-1 \\ +1-1+1-1 \\ +1-1-1+1 \end{bmatrix} \times$$

$$\begin{bmatrix} +1+1+1+1+1+1+1+1-1-1-1-1-1-1-1-1 \\ +1+1+1+1-1-1-1-1+1+1+1+1-1-1-1-1 \\ +1+1-1-1+1+1-1-1+1+1-1-1+1+1-1-1 \\ +1-1+1-1+1-1+1-1+1-1+1-1+1-1+1-1 \end{bmatrix}$$

$$= \begin{bmatrix} +4+2+2+0+2+0+0-2+2+0+0-2+0-2-2-4 \\ +0+2+2+4-2+0+0+2-2+0+0+2-4-2-2+0 \\ +0+2-2+0+2+4+0+2-2+0-4-2+0+2-2+0 \\ +0-2+2+0+2+0+4+2-2-4+0-2+0-2+2+0 \end{bmatrix} \quad [1]$$

Note:
Bolded columns are already in orthogonal mode because they contain only one non-zero entry.

As can be seen from matrix [1], eight bolded columns (i.e., signal combinations) are converted to orthogonal modes with amplitudes of −4, 0, and +4. The problem addressed by the present invention is how to also place the other eight columns into unique orthogonal modes for transfer over the transmission medium. (In matrix [1] those bolded columns having amplitudes of −4, 0, and/or +4 are in orthogonal modes since the parallel transmission of those signal combinations will generate minimal crosstalk (i.e., capacitive and inductive coupling) within the transmission medium.)

The preferred approach described and claimed herein is to change the amplitude of the intrinsic orthogonal mode signals (i.e., the bolded columns) to define unique modal signals for each of the remaining information signals. Again, in this example the goal is to convert the remaining eight non-modal combinations (see matrix [1]) into a unique modal signal identified with an orthogonal mode of the transmission medium. Pursuant to the present invention, this is accomplished by changing the amplitudes of these intrinsic orthogonal modes (i.e., the bolded columns) by a constant factor. For example, ×2 amplitude modulation can be imposed on the above-noted intrinsic orthogonal modes to produce unique modal signals as set forth in matrix [2]. The eight intrinsic orthogonal modes as multiplied by two are then substituted for the eight non-modal combinations.

$$\begin{bmatrix} +4 & +8 & +0 & +0 & +0 & +0 & +0 & +0 & +0 & +0 & +0 & +0 & +0 & +0 & -8 & -4 \\ +0 & +0 & +8 & +4 & +0 & +0 & +0 & +0 & +0 & +0 & +0 & +0 & -4 & -8 & +0 & +0 \\ +0 & +0 & +0 & +0 & +8 & +4 & +0 & +0 & +0 & +0 & -4 & -8 & +0 & +0 & +0 & +0 \\ +0 & +0 & +0 & +0 & +0 & +0 & +4 & +8 & -8 & -4 & +0 & +0 & +0 & +0 & +0 & +0 \end{bmatrix} \quad [2]$$

Thus, in the example presented all sixteen possible binary combinations for parallel transmission over the four transmission lines depicted in FIG. 1 are resolved into unique modal signals each of which is identified with an orthogonal mode. Again, this result is made possible by selective use of amplitude modulation (e.g., as shown in matrix [2]).

To summarize, in a set of n transmission lines and a ground line, there exists 2×n modes of propagation (i.e., assuming that ± symmetry is employed). Each mode is a particular combination of all the line voltages to be transmitted in parallel through the transmission medium. Even though the transmission of binary information via orthogonal modes pursuant to the present invention requires additional hardware for encoding and decoding, the real benefit is that signals in these orthogonal modes propagate completely independently of each other, i.e., without crosstalk. Therefore, signal noise is reduced and propagation over longer distances (than otherwise feasible) becomes practical, along with the possibility of increasing transmission rates without increasing error.

Specific embodiments of encoder/decoder circuitry pursuant to the present invention are next discussed with reference to FIGS. 2-7, as well as related encoding/decoding methods. In these figures the same reference numbers/characters are used throughout multiple figures to designate the same or similar components.

Figure 2:
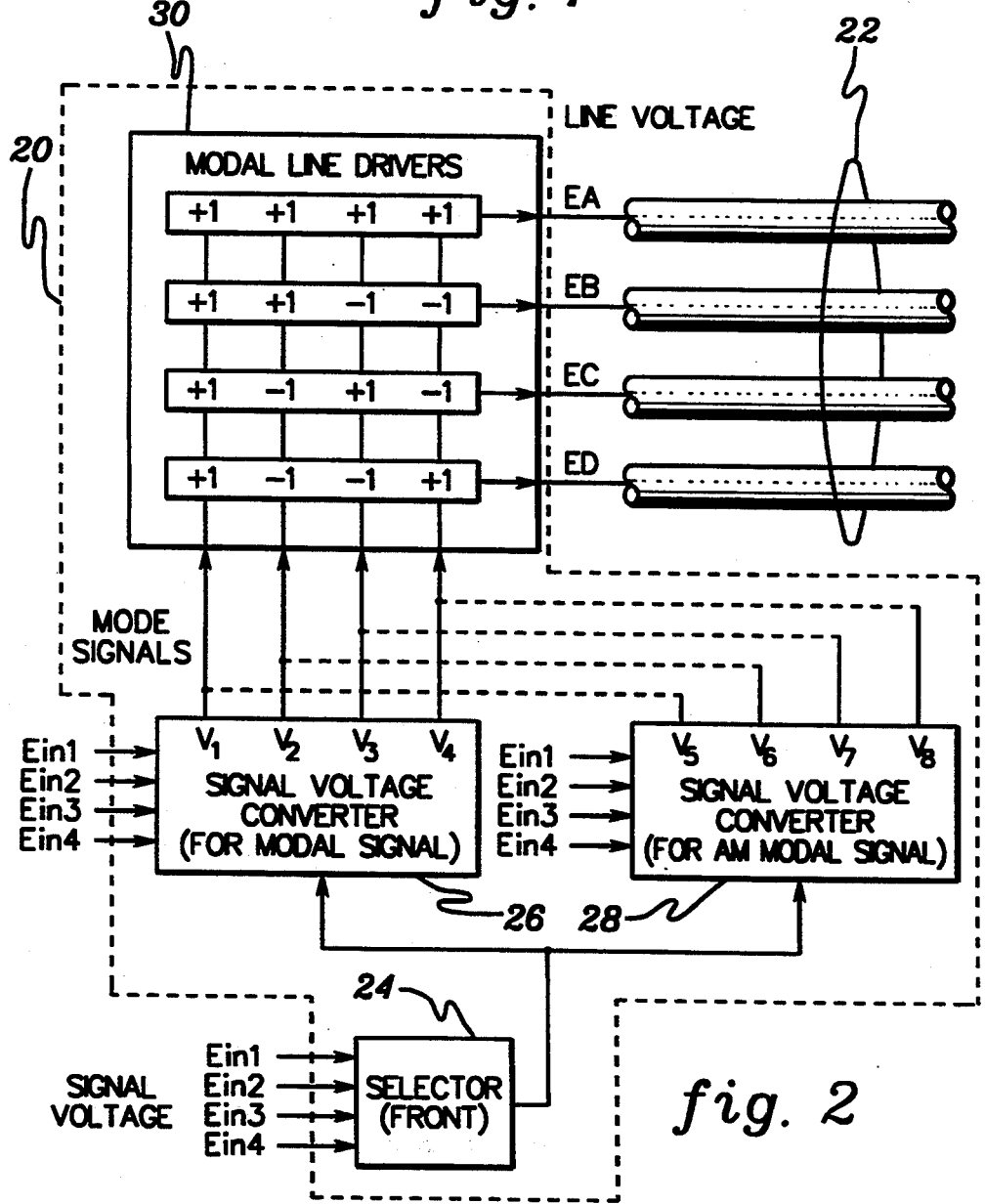
FIG. 2 is a block diagram of one embodiment of an encoding circuit pursuant to the present invention coupled to a transmission medium.

In FIG. 2 an encoding circuit, denoted 20, is depicted for converting four signal voltages Ein1, Ein2, Ein3, Ein4 (again assuming binary signals) to appropriate line voltages EA, EB, EC, ED for transmission on four parallel conductors 22 which are assumed to be arranged as shown in FIG. 1. Circuit 20 includes a selector (front) circuit 24 which selects between (i.e., enables one of) a first signal voltage converter 26 and a second signal voltage converter 28. Each converter 26 & 28 outputs mode signals (see matrix [2]) to modal line drivers 30 which are connected to transmission lines 22. Drivers 30 present the appropriate line voltages EA, EB, EC, ED to lines 22 for transmission of the information in orthogonal modes.

Figure 3:
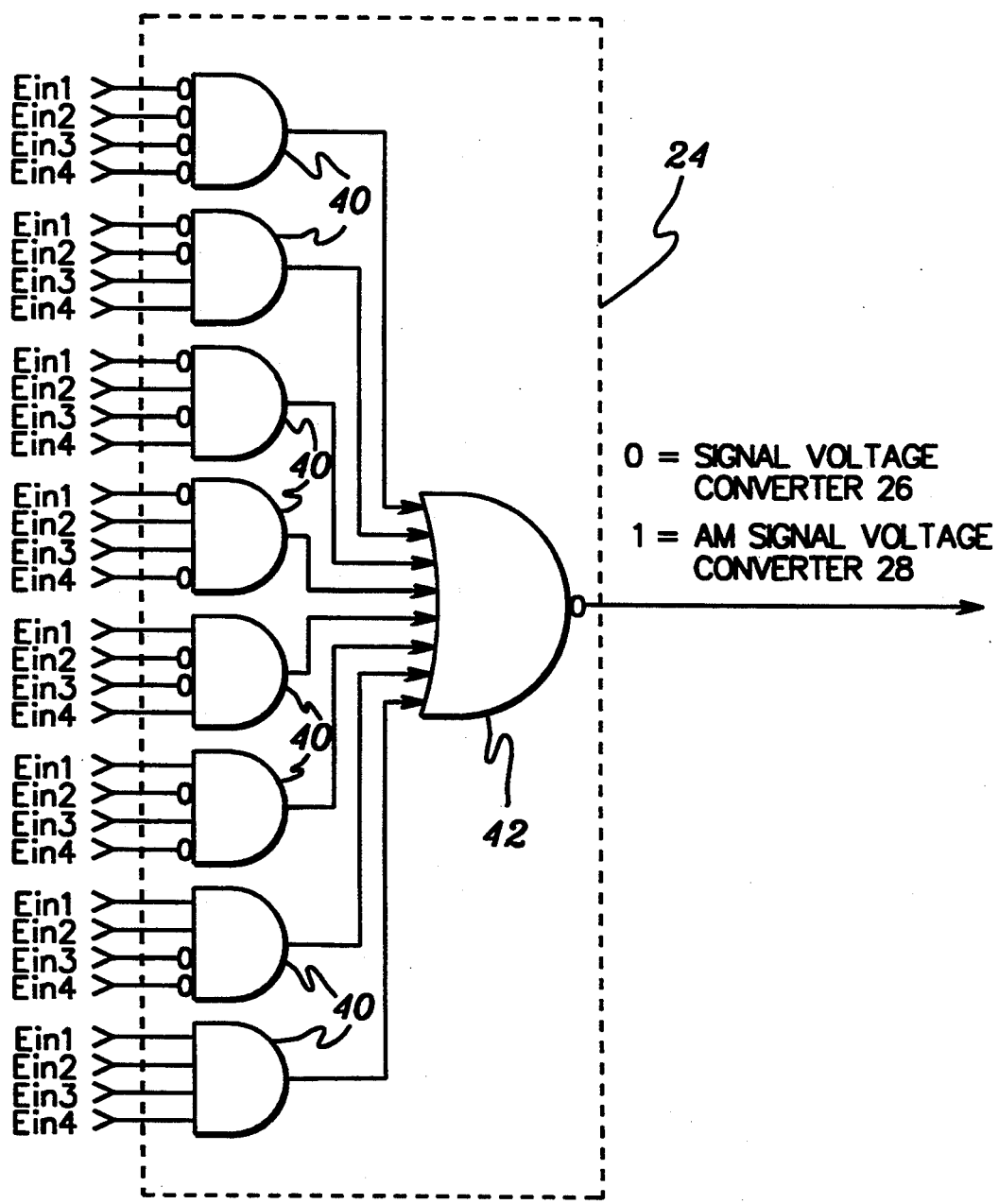
FIG. 3 is a schematic of one embodiment of a selector (front) circuit for the encoding circuit of FIG. 2.

One embodiment of selector (front) 24 is depicted in FIG. 3. In this embodiment, the four bits of binary information Ein1, Ein2, Ein3 & Ein4, are fed in parallel to each of eight AND circuits 40, which are respectively configured with inverters as shown. The outputs from AND circuits 40 are fed in parallel to a NOR circuit 42, the output of which comprises the control signal fed to signal voltage converter 26 and signal voltage converter 28 (FIG. 2). By way of example, if a "0" (or "−1") is output from selector 24 then modal converter 26 is assumed to be selected (i.e., enabled) through a gate control (not shown). Alternatively, if a "1" is output, then the amplitude-modulated (AM) converter 28 is driven.

Figure 4:
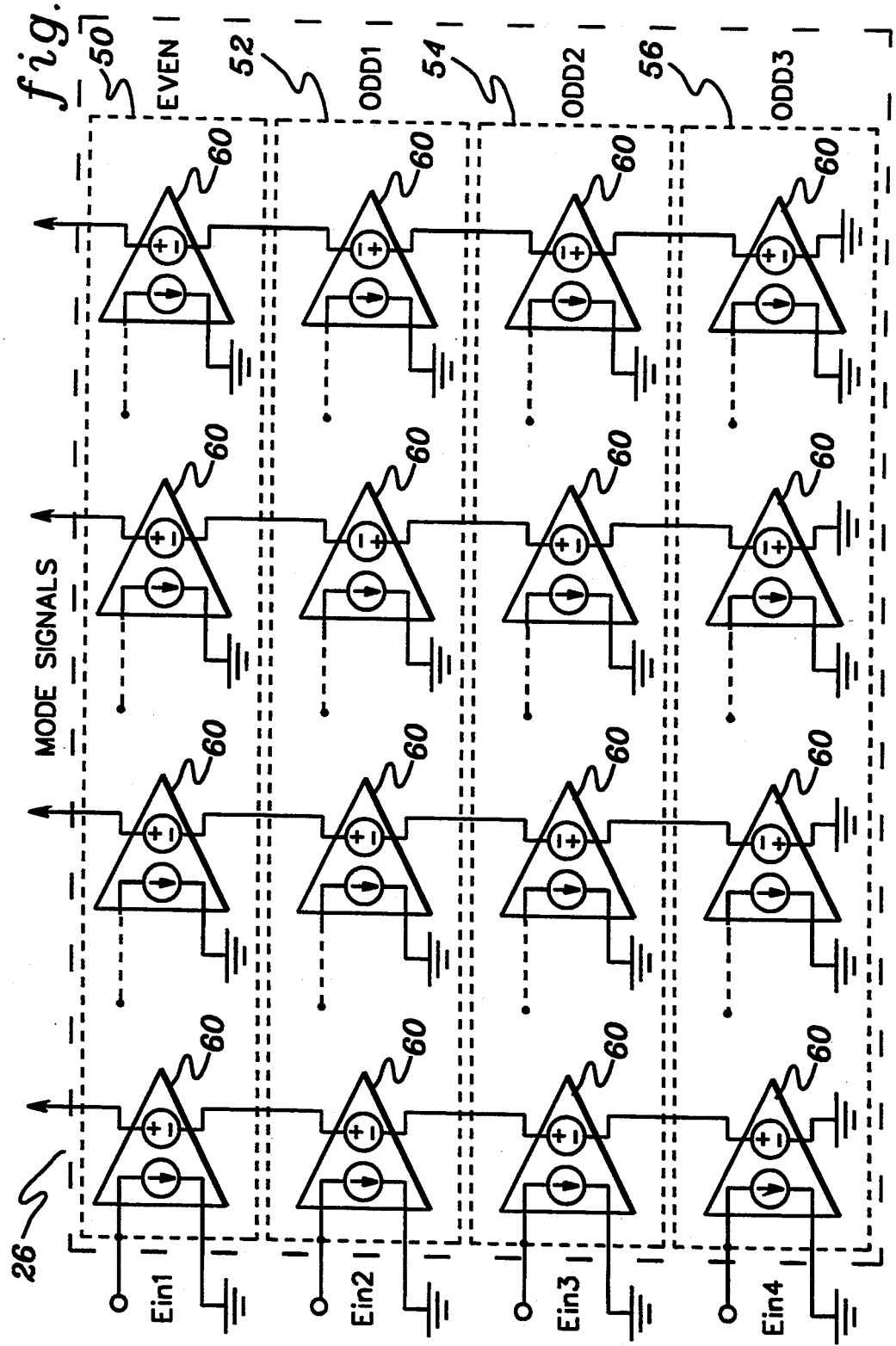
FIG. 4 is a schematic of one embodiment of a signal voltage converter for the encoding circuit of FIG. 2.

Converters 26 & 28 transform binary signal voltages Ein1, Ein2, Ein3, Ein4 to intermediate modal signals $V_1$, $V_2$, $V_3$, $V_4$ and $V_5$, $V_6$, $V_7$, $V_8$, respectively (see matrix [2]). These modal signals are attained by matrix multiplication of the incoming signal voltages with the Eigenvectors matrix employed above and separately set out below as matrix [3]. Each row/column of the matrix represents a coding for a single mode. As shown in FIG. 4 (which depicts one embodiment of converter 26), for all four modes (i.e., EVEN, ODD1, ODD2, ODD3) of the four conductor transmission medium of FIG. 1, the gains of the matrix of amplifiers must be configured as set forth in matrix [3].

$$\begin{bmatrix} +1 & +1 & +1 & +1 \\ +1 & +1 & -1 & -1 \\ +1 & -1 & +1 & -1 \\ +1 & -1 & -1 & +1 \end{bmatrix} \quad [3]$$

The upper row 50 of converter 26 is configured to generate an even modal signal (EVEN), while the next three rows 52, 54, & 56 respectively generate one of three odd signal modes (ODD1, ODD2, ODD3). (As already noted, for a set of four symmetrical transmission lines and a center ground line, there exist four intrinsic orthogonal modes for signal propagation through the medium (each of which can also have a plus or minus polarity).) Each amplifier in rows 50, 52, 54 & 56 of converter 26 comprises a unity-gain, voltage-to-voltage amplifier. As shown, the amplifiers are arranged in a four-by-four matrix (which, as noted, corresponds to matrix [3]). The amplifiers in each column of the matrix have their outputs connected in series so that there are four distinct sets with four amplifiers in each set and the output of each set comprises one output ($V_1$, $V_2$, $V_3$, $V_4$) of converter 26. In converter 26, the gain of each amplifier may be either +1 or −1, therefore the four inputs (which correspond to bit positions: units, twos, fours, & eights) can be coded into four outputs which correspond to (i.e., identify) the intrinsic orthogonal modes of the set of transmission lines.

Signal voltage converter 28 (for the amplitude-modulated modal (AM) signals) (FIG. 2) is essentially identical to the four-by-four matrix of voltage-to-voltage amplifiers depicted in FIG. 4. The principle difference would be in the use of 100 percent gain voltage-to-voltage amplifiers so that the modal signals $V_5$, $V_6$, $V_7$, $V_8$ output from converter 28 (FIG. 2) are twice (2×) the value of the modal signals $V_1$, $V_2$, $V_3$, $V_4$ output from converter 26.

Modal line drivers 30 receive an identified non-amplified or amplified mode signal from converter 26 or 28, respectively, and linearly combine the identified mode signal to drive the parallel transmission lines with line voltages EA, EB, EC, ED in the corresponding orthogonal mode of the transmission medium (i.e., EVEN, ODD1, ODD2, ODD3). More particularly, for a non-amplified mode signal, line voltages EA, EB, EC & ED are produced by implementing equations (1) within modal line drivers 30.

$$EA = 1 \cdot (V_1) + 1 \cdot (V_2) + 1 \cdot (V_3) + 1 \cdot (V_4)$$

$$EB = 1 \cdot (V_1) + 1 \cdot (V_2) - 1 \cdot (V_3) - 1 \cdot (V_4)$$

$$EC = 1 \cdot (V_1) - 1 \cdot (V_2) + 1 \cdot (V_3) - 1 \cdot (V_4)$$

$$ED = 1 \cdot (V_1) - 1 \cdot (V_2) - 1 \cdot (V_3) + 1 \cdot (V_4) \quad (1)$$

These linear equations could also be expressed in matrix form as matrix [4]:

$$\begin{bmatrix} EA \\ EB \\ EC \\ ED \end{bmatrix} = \begin{bmatrix} +1 & +1 & +1 & +1 \\ +1 & +1 & -1 & -1 \\ +1 & -1 & +1 & -1 \\ +1 & -1 & -1 & +1 \end{bmatrix} \begin{bmatrix} V_1 \\ V_2 \\ V_3 \\ V_4 \end{bmatrix}$$

Wherein:

$$\begin{bmatrix} V_1 \\ V_2 \\ V_3 \\ V_4 \end{bmatrix} = \text{line signals (line voltages)}$$

$$\text{line signals} = \begin{bmatrix} +1 & +1 & +1 & +1 \\ +1 & +1 & -1 & -1 \\ +1 & -1 & +1 & -1 \\ +1 & -1 & -1 & +1 \end{bmatrix} \times \text{modal signal matrix}$$

$$\text{modal signal matrix} = \begin{bmatrix} +1 & +1 & +1 & +1 & -1 & -1 & -1 & -1 \\ +1 & +1 & -1 & -1 & +1 & +1 & -1 & -1 \\ +1 & -1 & +1 & -1 & +1 & -1 & +1 & -1 \\ +1 & -1 & -1 & +1 & -1 & +1 & +1 & -1 \end{bmatrix}$$

Such that:

$$\begin{bmatrix} EA \\ EB \\ EC \\ ED \end{bmatrix} = 4 \begin{bmatrix} +1 & +1 & +1 & +1 & -1 & -1 & -1 & -1 \\ +1 & +1 & -1 & -1 & +1 & +1 & -1 & -1 \\ +1 & -1 & +1 & -1 & +1 & -1 & +1 & -1 \\ +1 & -1 & -1 & +1 & -1 & +1 & +1 & -1 \end{bmatrix} \quad [4]$$

Similarly, when amplitude-modulated (AM) mode signal are input to drivers 30, equations (2) are implemented.

$$EA = 1 \cdot (V_5) + 1 \cdot (V_6) + 1 \cdot (V_7) + 1 \cdot (V_8)$$

$$EB = 1 \cdot (V_5) + 1 \cdot (V_6) - 1 \cdot (V_7) - 1 \cdot (V_8)$$

$$EC = 1 \cdot (V_5) - 1 \cdot (V_6) + 1 \cdot (V_7) - 1 \cdot (V_8)$$

$$ED = 1 \cdot (V_5) - 1 \cdot (V_6) - 1 \cdot (V_7) + 1 \cdot (V_8) \quad (2)$$

Equations (2) can also be expressed in matrix form as matrix [5]:

$$\begin{bmatrix} EA \\ EB \\ EC \\ ED \end{bmatrix} = \begin{bmatrix} +1 & +1 & +1 & +1 \\ +1 & +1 & -1 & -1 \\ +1 & -1 & +1 & -1 \\ +1 & -1 & -1 & +1 \end{bmatrix} \begin{bmatrix} V_5 \\ V_6 \\ V_7 \\ V_8 \end{bmatrix}$$

Wherein:

$$\begin{bmatrix} V_5 \\ V_6 \\ V_7 \\ V_8 \end{bmatrix} = 2 \begin{bmatrix} +1 & +1 & +1 & +1 \\ +1 & +1 & -1 & -1 \\ +1 & -1 & +1 & -1 \\ +1 & -1 & -1 & +1 \end{bmatrix} \times \text{modal signal matrix}$$

$$\text{modal signal matrix} = \begin{bmatrix} +1 & +1 & +1 & +1 & -1 & -1 & -1 & -1 \\ +1 & +1 & -1 & -1 & +1 & +1 & -1 & -1 \\ +1 & -1 & +1 & -1 & +1 & -1 & +1 & -1 \\ +1 & -1 & -1 & +1 & -1 & +1 & +1 & -1 \end{bmatrix}$$

Such that:

$$\begin{bmatrix} EA \\ EB \\ EC \\ ED \end{bmatrix} = 8 \begin{bmatrix} +1 & +1 & +1 & +1 & -1 & -1 & -1 & -1 \\ +1 & +1 & -1 & -1 & +1 & +1 & -1 & -1 \\ +1 & -1 & +1 & -1 & +1 & -1 & +1 & -1 \\ +1 & -1 & -1 & +1 & -1 & +1 & +1 & -1 \end{bmatrix} \quad [5]$$

Figure 5:
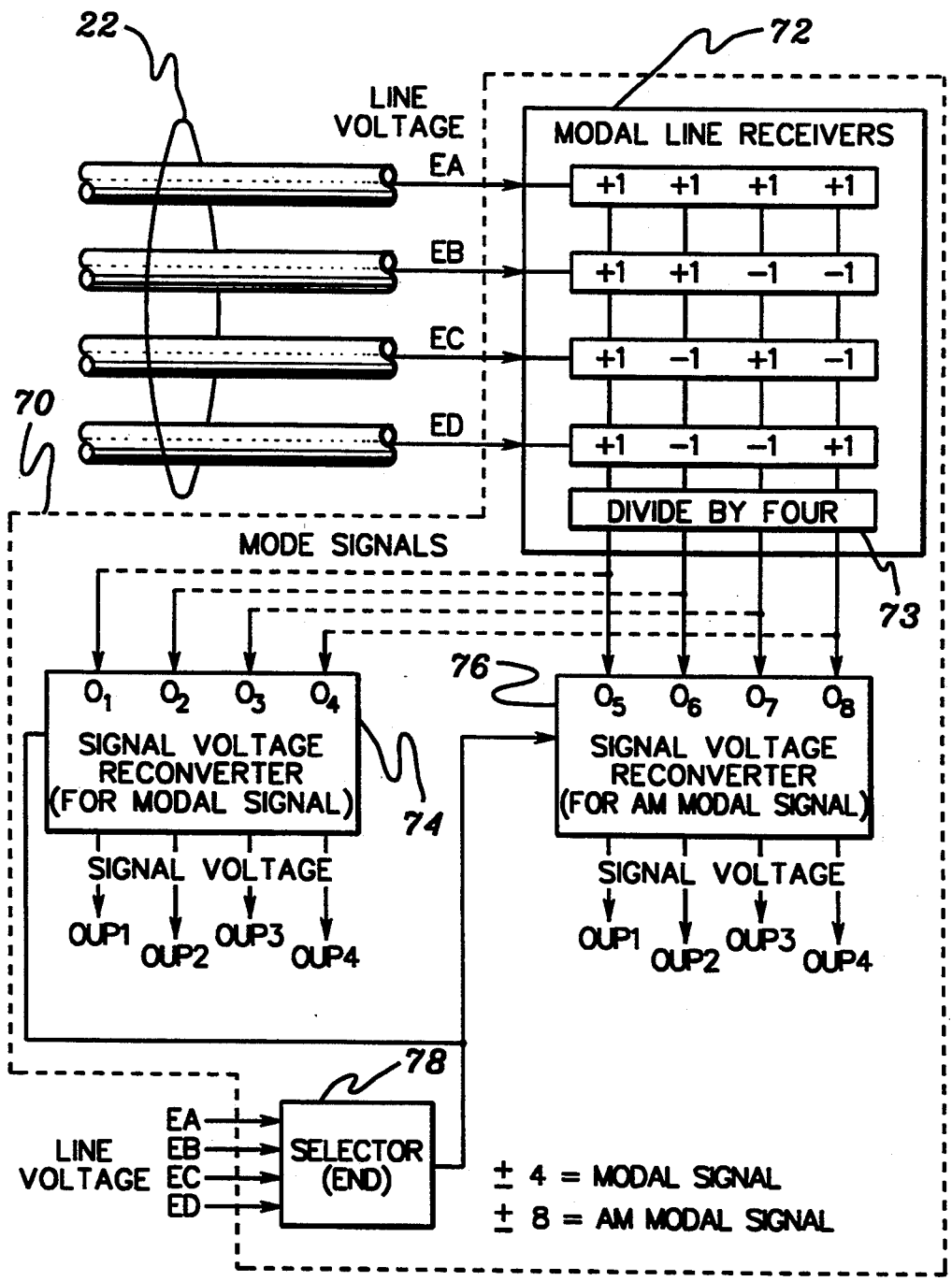
FIG. 5 is a block diagram of one embodiment of a decoding circuit pursuant to the present invention coupled to the transmission medium of FIG. 2.

To summarize, the function of modal line drivers 30 is to ensure that transmission lines 22 are driven in orthogonal modes, with the desired orthogonal mode being indicated by the output of enabled converter 26 or enabled converter 28 as determined by selector (front) circuit 24 in response to the inputted binary signals Ein1, Ein2, Ein3, Ein4. At a receiving end of transmission lines 22, which are perfectly terminated for all modes of propagation, decoding circuitry is provided which is essentially a mirror image of the encoding circuitry presented in FIG. 2. One embodiment of a decoding circuit, labeled 70, pursuant to the present invention is depicted in FIG. 5.

Decoding circuit 70 includes modal line receivers 72 which accept transmitted line voltages EA, EB, EC, ED and convert a received signal to a corresponding orthogonal mode signal. (This is essentially the inverse operation of that performed by modal line drivers 30 of FIG. 2.) These mode signals, which comprise linear combinations of the line voltages, are either non-amplified orthogonal modes of the transmission medium (e.g., +4, −4) or amplitude-modulated (AM) orthogonal modes (+8, −8) as described above. If non-amplified orthogonal modes have been received, the signals are fed to inputs $O_1$, $O_2$, $O_3$, $O_4$ of a first signal voltage reconverter 74, while if amplitude-modulated (AM) orthogonal modes are identified, the signals are passed to inputs $O_5$, $O_6$, $O_7$, $O_8$ of a second signal voltage reconverter 76. Reconverter 74 or reconverter 76 is selectively enabled by a selector (end) circuit 78 which has as inputs the four line voltages EA, EB, EC, ED on lines 22 of the transmission system. The outputs of reconverters 74 & 76 are connected as lines OUP1, OUP2, OUP3, OUP4. These lines contain the originally encoded signal voltage, which in this embodiment, comprises the identical binary signal input at encoder circuit 20 (FIG. 2) at the front end of the transmission system as signal voltages Ein1, Ein2, Ein3, Ein4.

As noted, modal line receivers 72 implement the inverse operation of that performed by modal line drivers 30 of FIG. 2, except a divide by four logic 73 is interposed to identify the corresponding modal signals. The column outputs to the respective reconverters 74, 76 are defined by equations (3):

$$O_1(O_5) = +1 \cdot (EA) + 1 \cdot (EB) + 1 \cdot (EC) + 1 \cdot (ED)$$

$$O_2(O_6) = +1 \cdot (EA) + 1 \cdot (EB) - 1 \cdot (EC) - 1 \cdot (ED)$$

$$O_3(O_7) = +1 \cdot (EA) - 1 \cdot (EB) + 1 \cdot (EC) - 1 \cdot (ED)$$

$$O_4(O_8) = +1 \cdot (EA) - 1 \cdot (EB) - 1 \cdot (EC) + 1 \cdot (ED) \quad (3)$$

Figure 6:
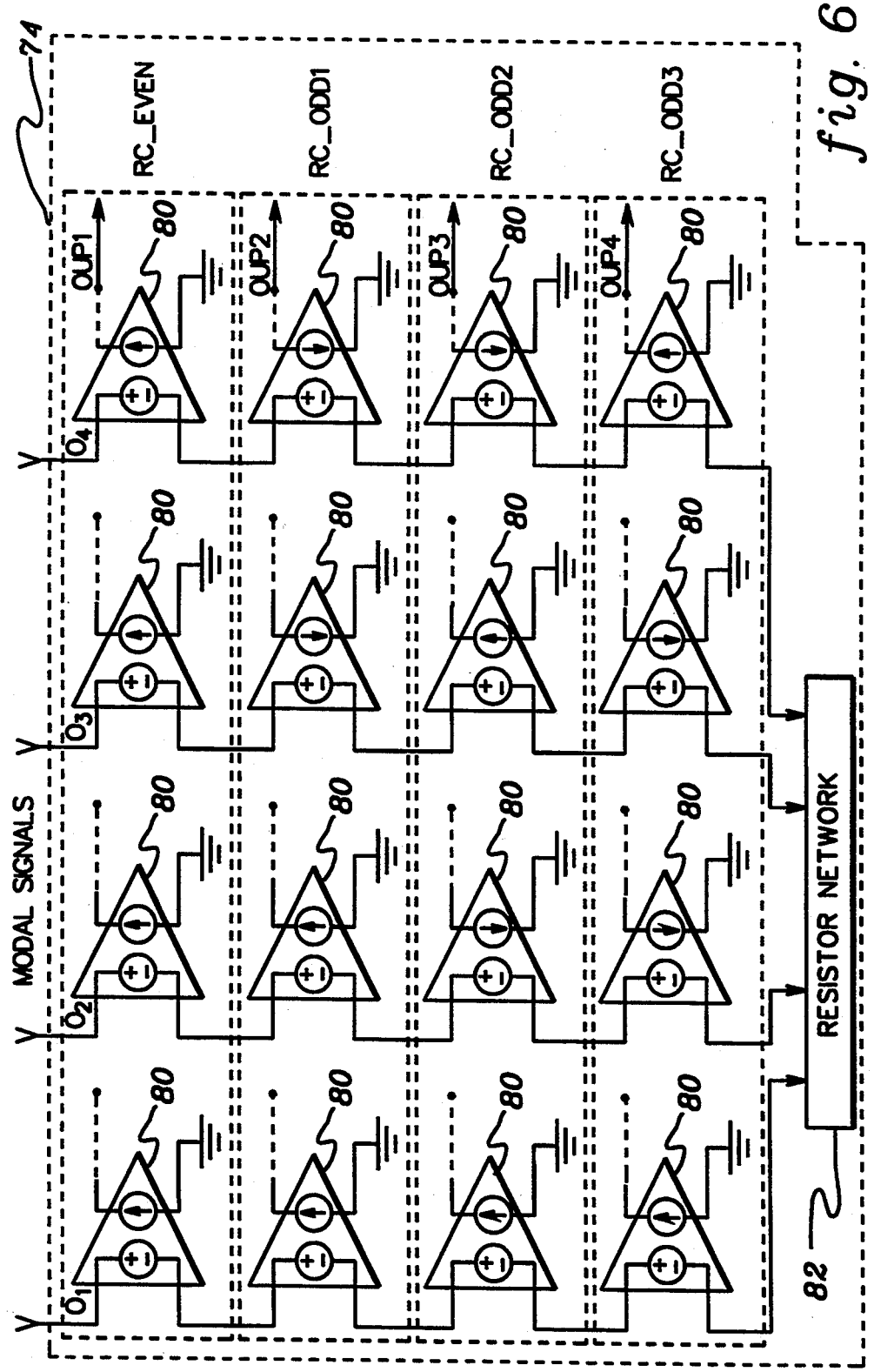
FIG. 6 is a schematic of one embodiment of a signal voltage reconverter for the decoding circuit of FIG. 5.

The identified mode signals are then input to the appropriate reconverter 74,76. One embodiment of a signal voltage reconverter 74 for the non-amplified modal signals is depicted in FIG. 6. Again, this embodiment is essentially the mirror image of converter 26 of FIG. 4.

In FIG. 6, the reconverter comprises a four-by-four array of unity-gain, current-to-voltage amplifiers 80. A network of resistors 82 terminates all four modes properly so that there are no reflections. The values of these resistors can be derived by one of ordinary skill in the art directly from the impedance matrix for the set of transmission lines. The voltage output from each row of amplifiers OUP1, OUP2, OUP3, OUP4, respectively, corresponds directly to the original binary information or signal voltage (Ein1, Ein2, Ein3, Ein4) of FIG. 2, only delayed by the length of time equal to the propagation delay through the set of transmission lines.

Figure 7:
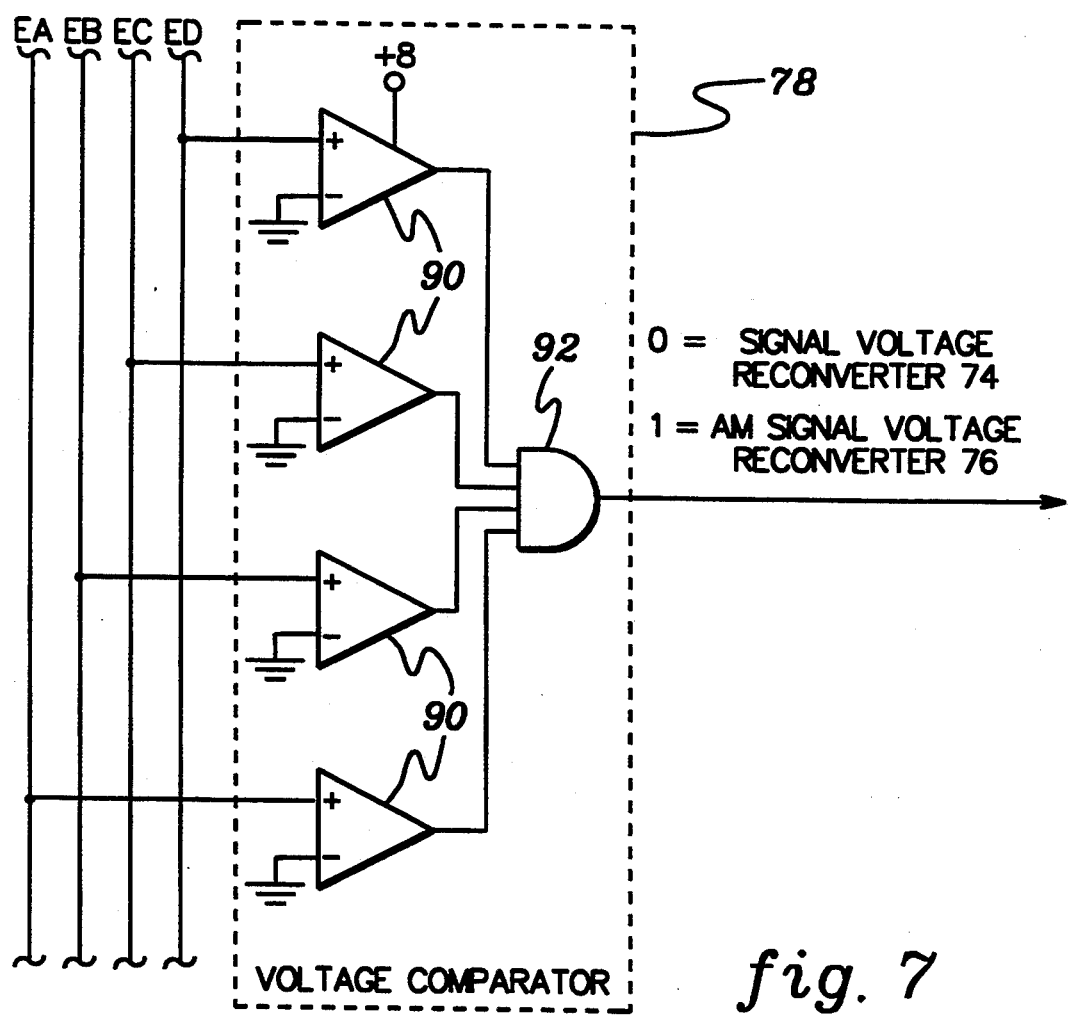
FIG. 7 is a schematic of one embodiment of a selector (end) circuit for the decoding circuit of FIG. 5.

One embodiment of selector (end) circuit 78 is depicted in FIG. 7. This circuit essentially comprises a voltage comparator and determines whether the received orthogonal mode signals (EA, EB, EC, ED) are plus/minus four (corresponding to a non-amplified orthogonal mode signal) or plus/minus eight (corresponding to an amplitude-modulated (AM) orthogonal mode signal). If plus/minus 4, then reconverter 74 is enabled, while if plus/minus eight, reconverter 76 is enabled. This is accomplished by four parallel connected amplifiers 90 whose outputs are fed to a AND circuit 92. Other possible circuit configurations will be readily apparent to one of ordinary skill in the art.

To summarize, presented herein is a novel and practical approach to implementation of orthogonal mode signal transmission of m information signals over a predefined transmission medium having n orthogonal modes, where $m>n$. Specific encoding and decoding circuits and techniques are presented. The important benefit to the practical approach described is that orthogonal modes propagate independently of each other with no crosstalk. Therefore, accurate propagation of information over longer transmission lines is feasible and practical, as well as increasing data transmission rate without increasing error.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A method for transferring m information signal combinations through a defined transmission medium having n orthogonal modes, wherein $m>n$, said method comprising the steps of:
   (a) encoding said m information signal combinations for propagation over said transmission medium as line signals each of which corresponds to one of said transmission medium's n orthogonal modes, said encoding including producing line signals for at least some of said m information signal combinations by amplitude modulating at least some of said transmission medium's n orthogonal modes;
   (b) propagating said line signals of said step (a) corresponding to said transmission medium's orthogonal modes through said transmission medium; and
   (c) receiving said line signals propagated through said transmission medium and decoding said received line signals to restore said m information signal combinations, whereby propagation of information signal combinations as line signals corresponding to said transmission medium's orthogonal modes restricts crosstalk within said transmission medium during said signal propagating step (b).

2. The information transferring method of claim 1, wherein said amplitude modulating of said encoding step (a) includes amplifying by a constant multiple said at least some orthogonal modes of said transmission medium to derive unique line signals for said at least some of said m information signal combinations, each of said unique line signals corresponding to one of said transmission medium's n orthogonal modes.

3. The information transferring method of claim 1, wherein said m information signal combinations comprise m binary information signal combinations and said transmission medium comprises n parallel transmission lines and a ground line, and wherein $m=2^n$ such that said encoding step (a) includes assigning a unique one of $2^n$ line signals for each of the m binary information signal combinations.

4. The information transferring method of claim 3, wherein n equals four and said four parallel transmission lines are symmetrically arranged about said ground line, and wherein said encoding step (a) includes encoding one half of said m information signal combinations as line signal combinations by amplitude modulating a corresponding one of said transmission medium's four orthogonal modes.

5. The information transferring method of claim 1, further comprising predetermining said transmission medium's n orthogonal modes and preassigning a unique line signal to each of said m information signal combinations to be transferred, each unique line signal being identified with one of said transmission medium's n orthogonal modes, and wherein said encoding step (a) includes encoding in real time a stream of information signal combinations as a corresponding stream of line signals for propagation through said transmission medium.

6. The information transferring method of claim 1, wherein said encoding step (a) includes identifying a unique modal signal for each of said m information signal combinations, each unique modal signal being identified with one of said transmission medium's n orthogonal modes, and wherein said encoding step (a) includes producing said line signals from said unique modal signals.

7. The information transferring method of claim 6, wherein said encoding step (a) further includes driving said line signals onto said transmission medium.

8. The information transferring method of claim 6, wherein said encoding step (a) employs a first encoder for producing orthogonal modal signals and a second encoder for producing amplitude-modulated orthogonal modal signals, said orthogonal modal signals and said amplitude-modulated orthogonal modal signals together comprising said unique modal signals, and wherein said encoding step (a) includes for each of said m information signal combinations selectively employing said first encoder and said second encoder to produce a corresponding unique modal signal.

9. The information transferring method of claim 8, wherein said encoding step (a) employs said first encoder to produce said orthogonal modal signals by matrix multiplication of said m information signal combinations with the matrix:

$$\begin{bmatrix} +1 & +1 & +1 & +1 \\ +1 & +1 & -1 & -1 \\ +1 & -1 & +1 & -1 \\ +1 & -1 & -1 & +1 \end{bmatrix}.$$

10. The information transferring method of claim 9, wherein said encoding step (a) employs said second encoder to produce said amplified-modulated orthogonal modal signals by matrix multiplication of said m information signal combinations with the matrix product:

$$x \begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

wherein: $x > 1$.

11. The information transferring method of claim 1, wherein said receiving and decoding step (c) includes decoding each received line signal into one of m unique modal signals, each of said m unique modal signals being identified with one of said transmission medium's n orthogonal modes and each comprising either an orthogonal modal signal or an amplitude-modulated orthogonal modal signal.

12. The information transferring method of claim 11, wherein said receiving and decoding step (c) further includes selectively employing a first decoder and a second decoder to restore said m information signal combinations, said first decoder receiving orthogonal modal signals for restoration and said second decoder receiving amplitude-modulated orthogonal modal signals for restoration.

13. A method for encoding one of m information signal combinations for transfer over a defined transmission medium having n orthogonal modes, wherein $m > n$, said information encoding method comprising the steps of:
 (a) assigning from a plurality of unique orthogonal modal signals a unique orthogonal modal signal to each of said m information signal combinations, said assigned unique orthogonal modal signals each being identified with one of said transmission medium's n orthogonal modes, wherein $m > n$ and at least some orthogonal modal signals of said plurality of unique orthogonal modal signals comprise amplitude modulated orthogonal modal signals of said transmission medium;
 (b) converting said one of m information signal combinations into its assigned unique orthogonal modal signal of said step (a); and
 (c) driving said transmission medium in the orthogonal mode identified with said unique orthogonal modal signal of said step (b), whereby when propagating an information signal through the transmission medium as a unique orthogonal mode signal crosstalk within said transmission medium is restricted.

14. The information encoding method of claim 13, wherein said method further comprises the step of generating said at least some unique orthogonal modal signals by matrix multiplication of said m information signal combinations with the matrix:

$$\begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

15. The information encoding method of claim 14, wherein said method further comprises the step of generating said at least some amplitude-modulated orthogonal modal signals by matrix multiplication of said m information signal combinations with the matrix product:

$$x \begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

wherein: $x > 1$.

16. The information encoding method of claim 15, wherein said converting step (b) includes employing a first encoder to produce an assigned orthogonal mode signal and a second encoder to produce an assigned amplitude-modulated orthogonal modal signal, and wherein said step (b) further includes selecting between said first encoder and said second encoder based upon said one of m information signal combinations to be converted.

17. The information encoding method of claim 13, wherein said m information signal combinations comprise m binary information signal combinations and said transmission medium comprises n parallel transmission lines and a ground line, and wherein $m = 2^n$ such that said unique modal signals assigned in said step (a) are selected from a $2^n$ plurality of modal signals, one half of said $2^n$ modal signals comprising non-amplitude-modulated orthogonal modal signals and one half of said $2^n$ modal signals comprising amplitude-modulated orthogonal modal signals.

18. The information encoding method of claim 13, wherein said assigning step (a) includes generating said plurality of unique orthogonal modal signals by amplitude modulating at least some of said transmission medium's n orthogonal modes.

19. A method for identifying one of m information signal combinations from a corresponding one of m possible line signal combinations propagated through a defined transmission medium having n orthogonal modes, wherein $m > n$, at least some of said m possible line signal combinations comprising amplitude-modulated orthogonal modes of said transmission medium, said method employing a predefined relationship between said m possible information signal combinations and m corresponding line signal combinations, each line signal combination being associated with one of said n orthogonal modes of said transmission medium, said method comprising the steps of:
 (a) receiving said one of m possible line signal combinations propagated through said transmission medium;
 (b) identifying from said line signal combination received in step (a) the corresponding mode signal indicative of the orthogonal mode at which said line signal is propagated; and
 (c) converting said identified mode signal of step (b) into the corresponding information signal using the predefined relationship between said m information signal combinations and said m line signal combinations, whereby propagation of an information signal as a line signal corresponding to one of said transmission medium's n orthogonal modes restricts crosstalk within said transmission medium, wherein $m > n$.

20. The method of claim 19, wherein each of said m line signal combinations comprise either an orthogonal modal signal combination or an amplitude-modulated orthogonal modal signal combination, and wherein said converting step (c) includes selectively employing a first decoder and a second decoder to restore said one of m information signal combinations, said first decoder receiving an orthogonal modal signal combination for restoration and said second decoder receiving an amplitude-modulated orthogonal modal signal combination for restoration.

21. The method of claim 19, wherein n equals four and said m information signal combinations comprise m binary information signal combinations.

22. A system for transferring one of m information signal combinations through a defined transmission medium having n orthogonal modes, said system comprising:
(a) means for encoding said one of m information signal combinations as a unique line signal corresponding to one of said transmission medium's n orthogonal modes for propagation through said transmission medium in said corresponding orthogonal mode, each of said m information signal combinations having a preassigned unique line signal corresponding to one of said transmission medium's n orthogonal modes, at least some of said preassigned unique line signals comprising amplitude-modulated orthogonal modes of said transmission medium, wherein $m > n$;
(b) means for propagating said unique line signal of step (a) through said transmission medium; and
(c) means for receiving said unique line signal propagated through said transmission medium and for decoding said line signal to restore said one of m information signal combinations, whereby propagation of an information signal as a unique line signal corresponding to one of said transmission medium's n orthogonal modes restricts crosstalk within said transmission medium during signal propagation through the transmission medium.

23. The information transferring system of claim 22, wherein said m information signal combinations comprise m binary information signal combinations and said transmission medium comprises n parallel transmission lines and a ground line, and wherein $m = 2^n$ such that said encoding means includes means for assigning a unique one of $2^n$ line signals for each of the m binary information signal combinations.

24. The information transferring system of claim 23, wherein n equals four and said four parallel transmission lines are symmetrically arranged about said ground line, and wherein said encoding means includes means for encoding one half of said m information signal combinations as line signal combinations by amplitude modulating a corresponding one of said transmission medium's four orthogonal modes.

25. The information transferring system of claim 22, wherein said n orthogonal modes of said transmission medium are known and a unique line signal is preassigned to each of said m information signal combinations to be transferred by said system, each unique line signal being identified with one of said transmission medium's n orthogonal modes, and wherein said encoding means includes means for encoding in real time a stream of information signal combinations as a corresponding stream of line signals for propagation through said transmission medium, and wherein said propagating means includes means for driving said corresponding stream of line signals through said transmission medium in real time.

26. The information transferring system of claim 22, wherein said propagating means includes means for driving said line signals onto said transmission medium.

27. The information transferring system of claim 22, wherein said encoding means includes means for identifying a unique modal signal for each of said m information signal combinations, each unique modal signal being identified with one of said transmission medium's n orthogonal modes, and wherein said encoding means includes means for producing said line signals from said unique modal signals.

28. The information transferring system of claim 27, wherein said encoding means includes a first encoder for producing orthogonal modal signals and a second encoder for producing amplitude-modulated orthogonal modal signals, said orthogonal modal signals and said amplitude-modulated orthogonal modal signals together comprising said unique modal signals, and wherein said encoding means includes means for selectively employing said first encoder and said second encoder to produce a corresponding unique modal signal for each of said m information signal combinations.

29. The information transferring system of claim 28, wherein said encoding means employs said first encoder to produce said orthogonal modal signals by matrix multiplication of said m information signal combinations with the matrix:

$$\begin{bmatrix} +1 & +1 & +1 & +1 \\ +1 & +1 & -1 & -1 \\ +1 & -1 & +1 & -1 \\ +1 & -1 & -1 & +1 \end{bmatrix}.$$

30. The information transferring system of claim 29, wherein said encoding means employs said second encoder to produce said amplitude-modulated orthogonal modal signals by matrix multiplication of said m information signal combinations with the matrix product:

$$x \begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

wherein: $x > 1$.

31. The information transferring system of claim 22, wherein said receiving means includes means for decoding each received line signal into one of m unique modal signals, each of said m unique modal signals being identified with one of said transmission medium's n orthogonal modes and each comprising either an orthogonal modal signal or an amplitude-modulated orthogonal modal signal.

32. The information transferring system of claim 31, wherein said receiving means further includes a first decoder and a second decoder, said first decoder receiving an orthogonal modal signal for restoration and said second decoder receiving an amplitude-modulated orthogonal modal signal for restoration, and wherein said receiving means further includes means for selecting between said first decoder and said second decoder based upon said unique line signal propagated through said transmission medium.

* * * * *